Sept. 16, 1969
J. N. CARTWRIGHT
3,466,895
PRESTRESSED SHAFT
Filed March 4, 1968
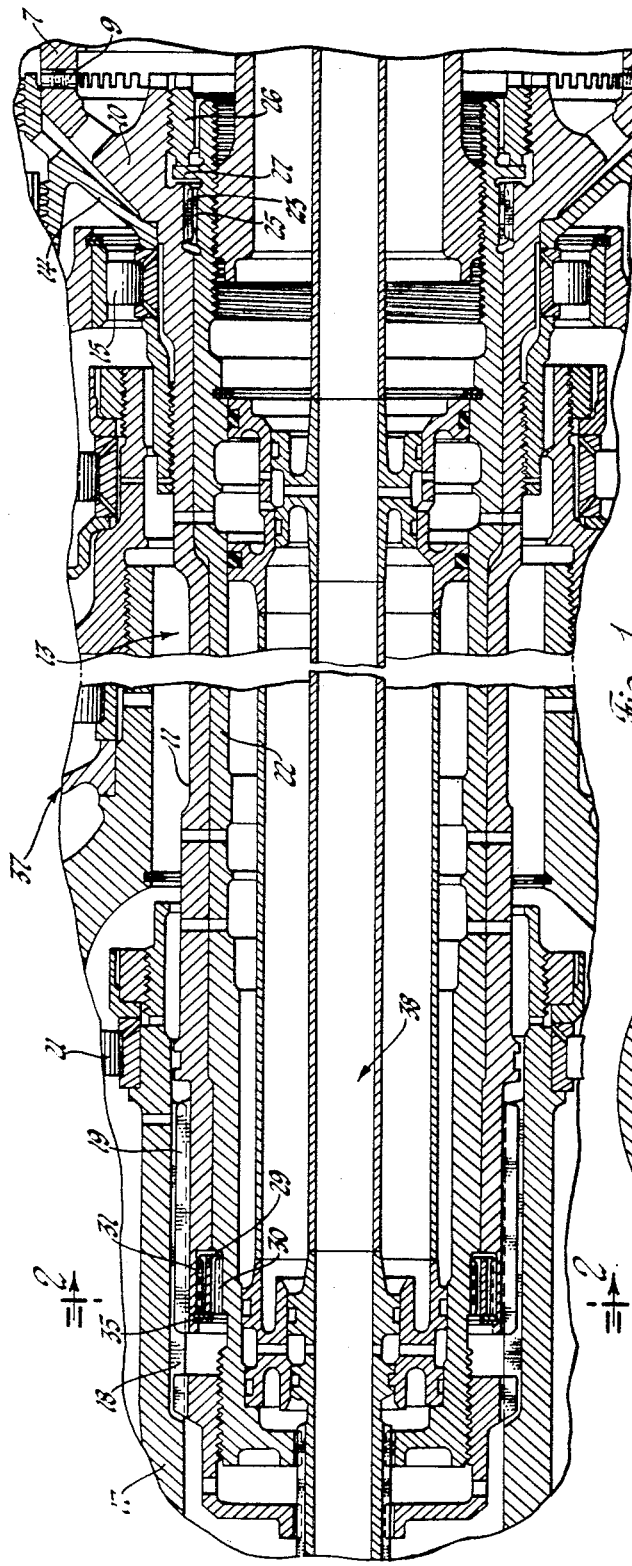
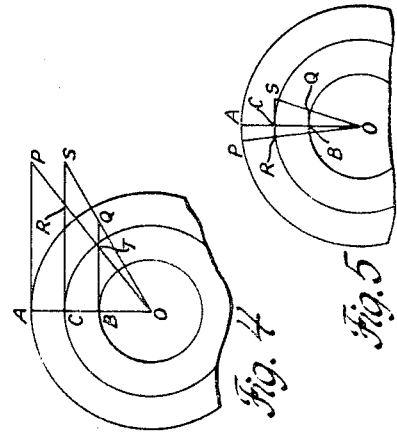
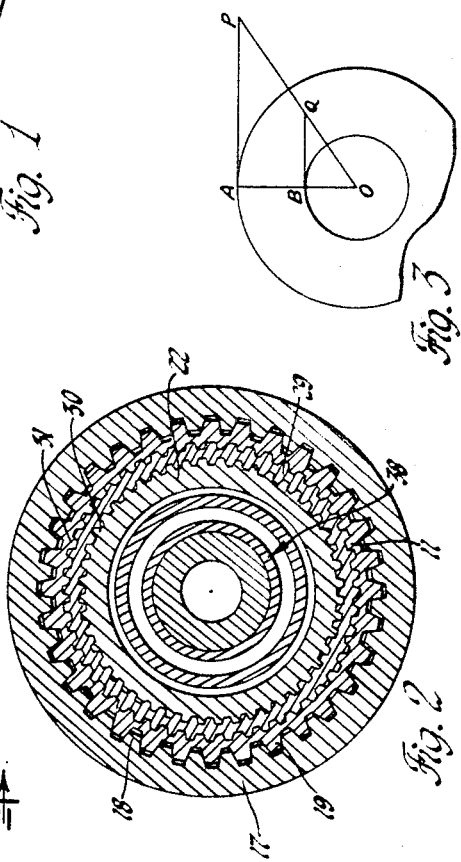
INVENTOR
John N. Cartwright
BY
Paul Fitzpatrick
ATTORNEY `United States Patent Office`

3,466,895
Patented Sept. 16, 1969

3,466,895
PRESTRESSED SHAFT
John N. Cartwright, Indianapolis, Ind., assignor to General Motors Corporation, Detroit, Mich., a corporation of Delaware
Filed Mar. 4, 1968, Ser. No. 710,325
Int. Cl. F16c 3/00, 3/03
U.S. Cl. 64—1                              5 Claims

ABSTRACT OF THE DISCLOSURE

A composite shaft is made up of coaxial telescoped inner and outer sections coupled together at both ends so that they are oppositely torqued by each other. The load carrying capacity of the composite shaft is greater than that of a single shaft of the same dimensions and material.

---

The invention herein described was made in the course of work under a contract or subcontract thereunder with the Department of Defense.

My invention is directed to shafts, particularly to shafts for carrying heavy torque loads which need to be made as small and light as possible as, for example, main shafts in aircraft gas turbine engines.

It is known that the unit stress in the material of a shaft due to a torsional load carried by the shaft varies directly with the distance from the axis of the shaft in shafts of circular cross section, whether solid or hollow. Obviously, the maximum shear stress, which is at the outer diameter of the shaft, must not be more than the maximum allowable stress for the particular metal. Thus, with the maximum stress at the outer diameter of the shaft, the unit stress varies linearly towards a value of zero at the shaft axis. Only the outermost fibers are carrying the full permissible load.

It has occurred to me that, by making a shaft up of two or more hollow concentric sections or sleeves, one within the other, and applying a calculated prestress to the sleeves, the load carrying capacity of a shaft of given outside and inside diameters may be appreciably increased; or, the weight or diameter of a shaft to carry a given load may be decreased. This is the principle underlying my invention which, as illustrated herein in its preferred embodiment, involves two concentric shaft sections so coupled as to exert residual torsional stresses on each other in such sense as to increase the stress at normal load of the inner shaft section and decrease the stress of the outer shaft section. The resulting composite shaft may be smaller than a one-piece shaft, which is particularly advantageous when it must be located within still another independently rotating shaft.

The principal object of my invention is to provide a shaft of increased torque carrying capacity for its diameter or weight; a further object is to improve the structure of machinery employing shafting, particularly machinery such as aircraft gas turbine engines.

The nature of my invention and the advantages thereof will be clear to those skilled in the art from the succeeding detailed description of the preferred embodiment of the invention and the accompanying drawings thereof.

FIGURE 1 is a partial view of a two-shaft gas turbine engine illustrating the main shaft connecting the low pressure turbine to the load, the view being taken on a plane containing the axis of the shaft.

FIGURE 2 is a cross-sectional view of the shaft taken in a plane indicated by the line 2—2 in FIGURE 1.

FIGURES 3, 4, and 5 are diagrams illustrating the principle of the invention.

Referring first to FIGURE 3, we may assume that this figure represents a hollow shaft, circular inside and out, with an axis O. an external radius OA, and an internal radius OB. If we assume the shaft is in torsion so that the stress in the outermost fiber is represented by the line AP in FIGURE 3, the stress in the innermost fiber will be represented by the line BQ, the point Q lying on a line drawn from P to O. The unit stress in the material of the shaft is directly proportional to its distance from the axis O. Obviously, if the interior portions of the shaft were stressed equally with the outermost fibers, the load carrying capacity of the shaft would be appreciably increased. The same load could be carried by a shaft of smaller external radius or one with a larger internal radius; the shaft being of less weight in either case.

Now referring to FIGURE 4, this represents a composite shaft of the same overall dimensions as the shaft of FIGURE 3. However, in this case there is an outer shaft section or sleeve having an outer radius OA and an inner radius OC and an inner shaft section or sleeve having an outer radius OC and an inner radius OB. Now, if we assume that somehow the two shafts are stressed so that the maximum unit stress in each shaft is the same, we may assume that this stress is AP in the outer shaft and CS, as shown in the diagram, in the inner shaft. In each case, the distribution of stress radially in each shaft follows the linear rule referred to above, so that the minimum stress in the outer shaft is CR and the minimum stress in the inner shaft is BQ. If we assume the maximum stress is the same as previously, an additional load represented on this diagram by the moment about O of the area TRSQ may be carried. Or, for the same torque load, the maximum stresses AP and CS may be appreciably less. Specifically, in the example diagrammed here in which the shafts are relatively thick, the maximum stress will be approximately nine-tenths of that of FIGURE 3, and it is so indicated in the scaled diagram.

Now if we assume the external load is removed from the shaft of FIGURE 4 but the two sections remain united, both shaft sections will unwind, and ultimately they will reach an equilibrium condition in which the two sections each have a small residual stress, torqued in opposite directions. Obviously, the moments of these stresses in the two shafts with respect to the axis O must be equal. This is illustrated in FIGURE 5, in which the maximum stress in the outer shaft section is represented by AP which is negative with respect to the previous stress and the maximum unit stress in the inner shaft section is CS, which is somewhat greater than AP because of the smaller diameter of the inner section.

It will be clear that the same principles can be applied to a composite shaft made up of a greater number of concentric sections than two, but there is no need to enlarge upon the explanation of such a structure. The maximum benefit will be obtained when, at the assumed maximum load, all of the shaft sections have the same maximum unit stress. Obviously, the more sections are provided, the more nearly the minimum stress in any shaft section will approach the maximum stress and, therefore, the more nearly the condition in which every fiber is carrying the full allowable unit load is approached. Structural complexity may make it unfeasible in most cases to apply this principle beyond two or three concentric shaft sections.

FIGURES 1 and 2 show a practical embodiment of the principle just explained. These show parts of the structure of a gas turbine engine of a known type in which a high pressure turbine drives a compressor and a low pressure turbine downstream of the high pressure turbine drives an external load. The shaft from the low pressure turbine to the load extends concentrically through the shaft which connects the high pressure turbine to the compressor. Details of the engine structure which are not material to an understanding of my invention will not be described. In the structure of FIG- URE 1, a low pressure turbine 7, a portion of the forward wheel of which is shown, is connected by face splines 9 to the bell end 10 of a hollow shaft 11 which is the outer shaft section of a composite shaft 13 according to my invention. Shaft section 11 bears a sleeve 14 by which it is rotatably supported in a roller bearing 15. The forward end of shaft section 11 extends into a power output shaft 17 to which it is coupled by internal splines 18 on the power shaft and external splines 19 on the shaft section 11. Shaft 17 is supported by bearings including a roller bearing 21.

In an engine which does not incorporate my invention, the shaft 13 would be a single hollow unitary shaft. According to my invention, the shaft 13 is made up of two telescoped concentric shaft sections, the outer one being the shaft section 11 previously referred to, and the inner one being a shaft section 22. The outside of shaft 22 is dimensioned for a free sliding fit within the interior of shaft section 11. The two shaft sections are coupled together torsionally at the rear end by internal splines 23 in shaft section 11 and external splines 25 on shaft section 22. Shaft section 22 is held in place within shaft section 11 by a spanner nut 26 bearing against a flange 27 on shaft section 22. Shaft sections 11 and 22 are coupled together torsionally at their forward ends by a coupling ring 29 which has both external and internal splines, the latter mating with external splines 30 on shaft section 22 and the former mating with internal spline 31 on shaft section 11.

After the two shaft sections are assembled together, the outer shaft section 11 may be torqued by a tool or machine applied to the splines 19 to provide the calculated desired degree of torsion in that shaft section. The torque should be twice the desired residual torque in each shaft section. The coupling ring 29 is then slid into place, preserving the relative windup of the shaft sections. When the torsion is released, shaft section 11 unwinds to a certain extent, torsioning inner shaft section 22. The degree of torsion may, of course, be calculated so as to achieve the desired result of equalizing the stresses in the outermost fibers of the two shaft sections under the design maximum load.

Coupling ring 29 may be retained by expanding snap rings 35 lodged in a circumferential groove in the outer shaft section. The coupling ring 29 may be designed to require a predetermined degree of relative rotation of the two shaft sections. However, it is preferred to design this structure so that the torsion may be varied by small or vernier increments. This may be done, for example, by providing forty splines on the exterior of the coupling ring and thirty-nine on the interior of the coupling ring, and corresponding numbers on the shaft sections, so that by properly indexing the coupling ring the splines may be engaged in vernier increments of relative windup of the two shafts.

The structure 37 shown external to the shaft 13 is the structure of the high pressure turbine and compressor and shafting joining these, which is immaterial to the invention. The structure 38 within shafts 17 and 13 is an arrangement of lubricating oil tubes from which oil is distributed through holes in the shafting, and also is immaterial to the present invention. Description of these is omitted in the interest of brevity.

It should be apparent to those skilled in the art from the foregoing description that the principles of my invention may be readily embodied in a simple and practical structure and that the benefits thereof in lightening or decreasing the size of a shaft to carry a given load are substantial. In the particular case, reducing the size of shaft 13 makes it possible to reduce bearing sizes on both this shaft and the high pressure turbine shaft.

Any desired structure, including welds or brazed areas, may be used to connect the shaft sections together instead of the splines illustrated.

The detailed description of the preferred embodiment of my invention for the purpose of explaining the principles thereof is not to be considered as restricting or limiting the invention, since many modifications may be made by the exercise of skill in the art without departing from the invention.

I claim:

1. A composite shaft comprising, in combination, a hollow outer shaft section, an inner shaft section disposed within the outer shaft section, and means torsionally coupling the two shaft sections together at both ends thereof with the two shaft sections exerting opposed residual torsional stresses on each other so that, when the composite shaft is stressed torsionally by a normal applied external load in the direction opposite to that of the residual stress on the outer shaft section, the maximum shear stress on the outer shaft is reduced.

2. A composite shaft as defined in claim 1 in which the shaft sections are in contact intermediate the ends thereof.

3. A composite shaft as defined in claim 2 in which the inner shaft is a slip fit within the outer shaft.

4. A composite shaft as defined in claim 1 in which the coupling means includes a ring splined to both shaft sections.

5. A composite shaft as defined in claim 4 in which the coupling means has different numbers of splines in the spline sets connecting it to the two shaft sections.

References Cited

UNITED STATES PATENTS

| | | | |
|---|---|---|---|
| 2,429,067 | 10/1947 | McDonald | 74—440 |
| 2,809,503 | 10/1957 | Gaubatz et al. | 64—1 |
| 2,822,677 | 2/1958 | Reynolds | 64—27 X |
| 3,142,973 | 8/1964 | Evans et al. | 64—1 |

FOREIGN PATENTS

| | | |
|---|---|---|
| 691,281 | 5/1953 | Great Britain. |

HALL C. COE, Primary Examiner.